(12) United States Patent
Wallentin et al.

(10) Patent No.: US 6,594,238 B1
(45) Date of Patent: Jul. 15, 2003

(54) METHOD AND APPARATUS FOR DYNAMICALLY ADAPTING A CONNECTION STATE IN A MOBILE COMMUNICATIONS SYSTEM

(75) Inventors: Bo S. P. Wallentin, Ljungsbro (SE); Leif P. Lindskog, Linköping (SE); Thomas Rimhagen, Linköping (SE); Per O. G. Bark, Linköping (SE); Ulf A. Hansson, Lerum (SE); Harri P. Vilander, Espoo (FI)

(73) Assignee: Telefonaktiebolaget LM Ericsson (publ), Stockholm (CH)

(*) Notice: Subject to any disclaimer, the term of this patent is extended or adjusted under 35 U.S.C. 154(b) by 0 days.

(21) Appl. No.: 09/099,773

(22) Filed: Jun. 19, 1998

(51) Int. Cl.⁷ .................................................. H04J 3/14
(52) U.S. Cl. ....................... 370/252; 370/341; 370/465; 455/452
(58) Field of Search ........................ 370/338, 341–343, 370/322, 348, 349, 468, 229–236, 465, 252–253; 455/452–453

(56) References Cited

U.S. PATENT DOCUMENTS

| 5,218,602 | A | * | 6/1993 | Grant et al. | 370/390 |
| 5,455,821 | A | * | 10/1995 | Schaeffer et al. | 370/332 |
| 5,590,133 | A | * | 12/1996 | Billstrom et al. | 370/349 |
| 5,625,573 | A | * | 4/1997 | Kim | |
| 5,666,348 | A | | 9/1997 | Thornberg et al. | |

(List continued on next page.)

FOREIGN PATENT DOCUMENTS

| GB | 2 301 992 | 12/1996 |
| WO | 96/34504 A | 10/1996 |
| WO | 96/37081 A | 11/1996 |
| WO | 98/03030 A | 1/1998 |
| WO | 98/24250 A | 6/1998 |

OTHER PUBLICATIONS

*XVI World Telecom Congress Proceedings*, ISS '97, Sep. 21, 1997, pp. 339–345, Andreas Schieder et al., "GRAN¹–A New Concept for Wireless Access in UMTS".

*IFIP Workshop TC6*, Jul. 2, 1995, pp. 34/1–34/10, XP002085769, Bradford (GB), Z. Fan et al., "ATM Traffic Prediction Using FIR Neural Networks".

*IEEE Network: The Magazine of Computer Communications*, vol. 9, No. 4, Jul. 1, 1995, pp. 34–45, XP000526590, Cui–Qing Yang et al., "A Taxonomy for Congestion Control Algorithms in Packet Switching Networks".

(List continued on next page.)

Primary Examiner—Dang Ton
Assistant Examiner—Inder Pal Mehra
(74) Attorney, Agent, or Firm—Nixon & Vanderhye P.C.

(57) ABSTRACT

In a mobile communications system that provides packet data services, a packet data connection is established between a mobile station and a radio access network. The state of the connection specifies one of plural different types of radio channels bearing the connection over the radio interface. The connection state preferably also may specify other parameters including for example, one of plural different mobility management schemes tailored to the selected channel type or channel bit rate(s). The connection is dynamically adapted to an optimal state based on one or more conditions relating to the connection. For example, one or more traffic parameters are determined for the connection and used to predict a future value of that parameter. Based on the predicted parameter value or values, an optimal connection state is determined and implemented. If the traffic parameter value changes later in the connection, another connection state may be dynamically selected that is better suited in accordance with the newly predicted parameter.

40 Claims, 11 Drawing Sheets

U.S. PATENT DOCUMENTS

| | | | |
|---|---|---|---|
| 5,673,259 A | | 9/1997 | Quick, Jr. |
| 5,764,631 A | * | 6/1998 | Ueda .......................... 370/332 |
| 5,873,036 A | * | 2/1999 | Vucetic ...................... 455/439 |
| 5,884,147 A | * | 3/1999 | Reudink et al. |
| 6,016,428 A | * | 1/2000 | Diachina et al. ............ 455/435 |
| 6,215,772 B1 | * | 4/2001 | Verma ........................ 370/236 |
| 6,236,646 B1 | * | 5/2001 | Beming et al. ............. 370/335 |
| 6,266,330 B1 | * | 7/2001 | Jokinen et al. ............. 370/329 |

OTHER PUBLICATIONS

*IEEE Communications*, vol. 15, No. 8, Oct. 1997, pp. 1477–1486, Ermanno Berruto, "Architectural Aspects for the Evolution of Mobile Communications Toward UMTS". *1993 43$^{rd}$ IEEE Vehicular Technology Conference*, Meadowlands Hilton, Secaucus, NJ, USA, May 18–20, 1993, pp. 520–523, Ermanno Berruto et al., "Variable–Rate for the Best Speech Service in UMTS".

*1994 IEEE*, COMSIG '94, pp. 41–45, M.F. Scheffer et al., "Fuzzy Modeling and Prediction of Network Traffic Fluctuations".

C–T. Lin and G. Lee, "Neural–Fuzzy Systems," pp. 667–674, Prentice Hall 1996.

Ph.D. Thesis, Peter Lindskog, Department of Electrical Engineering, Linköping University, S–581 83 Linköping, Sweden, 1996, "Methods, Algorithms, and Tools for System Identification Based on Prior Knowledge".

* cited by examiner

METHOD AND APPARATUS FOR DYNAMICALLY ADAPTING A CONNECTION STATE IN A MOBILE COMMUNICATIONS SYSTEM

TECHNICAL FIELD OF THE INVENTION

The present invention relates to mobile communications, and in particular, to dynamically adapting a data communication connection to an optimal state.

BACKGROUND AND SUMMARY OF THE INVENTION

In current and future mobile radio communication systems, a variety of different services either are or will be provided. While mobile telephone systems have traditionally provided voice services, packet data services are also becoming increasingly important. Example packet data services include e-mail, file transfers, and information retrieval using the Internet. Because packet data services often utilize system resources in a manner that varies over the course of a packet data session, the flow of packets is often characterized as "bursty." FIG. 1 is a graph that illustrates packet bursts communicated over time and interspersed over periods where no packets are transmitted. In general, the "density" of packets is high for short time periods and often very low for long periods.

Mobile communication systems must be able to accommodate both circuit-switched services well suited for applications like voice as well as packet-switched services well suited for bursty data applications like e-mail, and at the same time, those services must efficiently use the limited radio bandwidth. In the context of these different types of services, mobile communication systems should provide different types of channels and different schemes for keeping track of the mobile location hereafter referred to as "mobility management."

The Global System for Mobile communications (GSM) offers two categories of services including circuit-switched services via a Mobile Switching Center (MSC) node and packet-switched services via a General Packet Radio Service (GPRS) node. For circuit-switched, guaranteed service, e.g., High Speed Circuit-Switched Data (HSCSD), statically-dedicated traffic channels are employed. For packet-based, best effort service, another set of packet data channels are allocated from a pool of resources on a per packet basis using a media access control protocol or scheduling policy. Mobile communication systems in North America based on IS-95 standard offer packet data services by supporting variable rate transmission on an established, dedicated channel.

There are significant drawbacks with these current approaches which statically map a connection-oriented or a connectionless-oriented service onto a specific channel type. Inevitably, such static mapping results in a non-optimal use of system resources. Packet-switched services, in particular, require variable bandwidths and delays. A high-bandwidth, short-delay packet service like packet-switched audio and video benefits from using a dedicated channel reserved during the connection. But other packet services like messaging and e-mail do not require high bandwidth or short delay. In fact, the bursty nature of e-mail and messaging services underutilize a continuously reserved channel. The present invention overcomes these drawbacks and achieves optimal use of system resources by dynamically determining and allocating a best connection state depending on the packet data to be currently transmitted. In one embodiment, the connection state may specify the type of radio channel. In other embodiments, the connection state may specify additional characteristics. For example, an optimal channel type and a mobility management scheme best suited for that particular channel type may be dynamically allocated.

In a mobile communications system, a connection is established between a mobile station and a radio access network. A "connection" refers to a service provided by the radio access network to permit communication of information over a radio interface between the mobile station and the radio access network in both uplink (from the mobile) and downlink (to the mobile) directions. Such a connection may be established in response to the mobile station or by a core network connected to the radio access network. A connection may remain established even though the mobile station changes geographic cells/areas, i.e., a handover. The state of the connection specifies one of plural different types of radio channels to carry or bear the connection over the radio interface. The connection state preferably may also specify other characteristics such as one of plural, different mobility management schemes tailored to the selected channel type, channel bit rate(s), etc.

The connection is dynamically adapted to an optimal state based on one or more conditions relating to the connection. For example, one or more traffic parameters are determined for the connection and used to predict a future parameter value. Based on a predicted parameter value, an optimal connection state is determined and implemented. If the traffic parameters value changes later in the connection, another channel type may be dynamically selected that is better suited for the newly predicted parameter. Example traffic parameters are the amount of data to be sent in the future over the mobile data packet connection, packet arrival time, and packet density. A connection state may specify a radio channel type. Example channel types include a dedicated radio channel carrying data packets associated with only one mobile station and a shared radio channel carrying data packets associated with more than one mobile station. In addition, the shared radio channel type includes a temporary dedicated radio channel, a random access channel, and a paging channel. Taking the current amount of data in queue as an example traffic parameter, if the amount of data in the queue exceeds a threshold, it may be optimal to employ a dedicated channel to carry that high volume of data. Otherwise, it may be optimal to employ a shared channel.

The selected connection state may also specify one of plural mobility management (MM) schemes. In a first MM scheme, the mobile station's location is monitored on an individual cell basis. In a second MM scheme, the mobile station's location is monitored on a routing area basis, where a routing area includes plural cells. Still further, the connection state may specify the bit rate or bit rates. The bit rate may be fixed or, in the case of a variable rate channel, a maximum permitted rate or set of allowed bit rates. Of course, other and/or additional connection state parameters may also be employed.

In a preferred example embodiment, an optimal connection state is dynamically selected for a packet data connection from a plurality of connection states based on a predicted traffic parameter, where each connection state specifies a particular radio channel type and a particular mobility management scheme. In this example, the traffic parameter may be packet arrival time, and a non-linear, neural network-based predictor may be used to predict a next data packet arrival time over the connection using data packet arrival times of most recent data packet arrival times. In addition to a single traffic parameter, e.g., next packet arrival time, a next connection state may also be based on other additional factors and considerations including, for example, a desired bearer service, a current connection state, a current radio interference level, and a current amount of data in a queue associated with the connection.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, data flows, network elements, techniques, etc., in order to provide a thorough understanding of the present invention. However, it will be apparent to one skilled in the art that the present invention may be practiced in other embodiments that depart from these specific details. For example, while the present invention is described in the context of a universal mobile telecommunications system that uses GSM/UMTS terminology, those skilled in the art will appreciate that the present invention can be implemented in any mobile communications system. In addition, while much of the description focuses on radio channels, those skilled in the art will recognize that the present invention may be applied to any packet data communications environment. In other instances, detailed descriptions of well-known methods, interfaces, devices, and signaling techniques are omitted so as not to obscure the description of the present invention with unnecessary detail.

Figure 2:
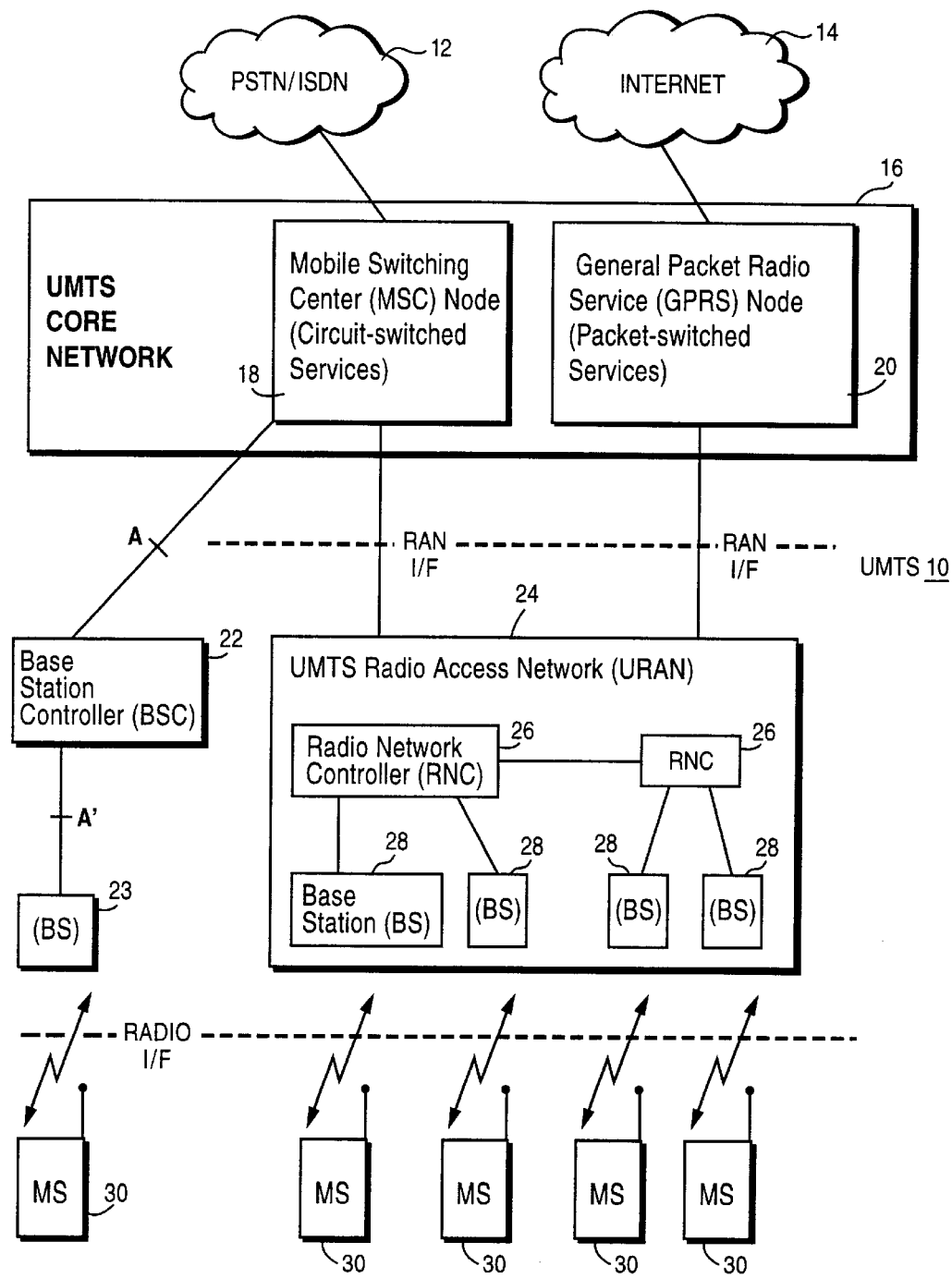
FIG. 2 is a function block diagram of a universal mobile telephone system in which the present invention may be advantageously employed in accordance with a preferred example embodiment.

The present invention is described in the context of a universal mobile telecommunications system (UMTS) 10 shown in FIG. 2. A representative, circuit-switched, external core network, shown as a cloud 12 may be for example the Public Switched Telephone Network (PSTN) and/or the Integrated Services Digital Network (ISDN). A representative, packet-switched external core network shown as a cloud 14, may be for example the Internet. Both external core networks are connected to corresponding service nodes of the UMTS core network 16. The PSTN/ISDN circuit-switched network 12 is connected to a circuit-switched service node shown as a Mobile Switching Center (MSC) node 18 that provides circuit-switched services. In the existing GSM model, the MSC 18 is connected over an interface A to a Base Station Controller (BSC) 22 which in turn is connected to radio base station 23 over interface $A_{bis}$. The Internet packet-switched network 14 is connected to a General Packet Radio Service (GPRS) node 20 tailored to provide packet-switched type services. Each of the core network service nodes 18 and 20 connects to a UMTS Radio Access Network (URAN) 24 over a radio access network (RAN) interface. URAN 24 includes one or more radio network controllers 26. Each RNC 26 is connected to a plurality of base stations (BS) 28 and to any other RNC's in the URAN 24.

In the preferred embodiment, radio access is based upon wideband, Code Division Multiple Access (WCDMA) with individual radio channels allocated using WCDMA spreading codes. WCDMA provides wide bandwidth for multimedia services and other high rate demands as well as robust features like diversity handoff and RAKE receivers to ensure high quality.

The URAN 24 provides services between mobile stations 30 and UMTS core network service nodes 12 and 14 (and ultimately to external core network end users). With respect to example embodiments of the present invention described hereafter, the term connection describes an information transfer service provided by the URAN 24. A connection permits transfer of user data information, e.g., packet data, in one or several information streams (bearers) as well as transfer of control signaling information between a mobile station 30 and the URAN 24 in both uplink and downlink directions. Such a connection is established upon request by the mobile station 30 or one of the UMTS core network service nodes 18, 20 and is maintained even as the mobile station moves. In accordance with the invention, the type of packet data service or the connection state may be selected and dynamically changed or adapted to optimize use of radio communication resources.

Figure 1:
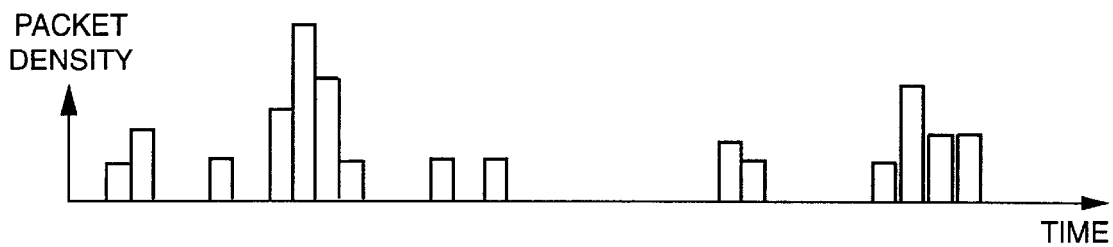
FIG. 1 is a packet density diagram illustrating the bursty nature of packet data communication.
Figure 3:
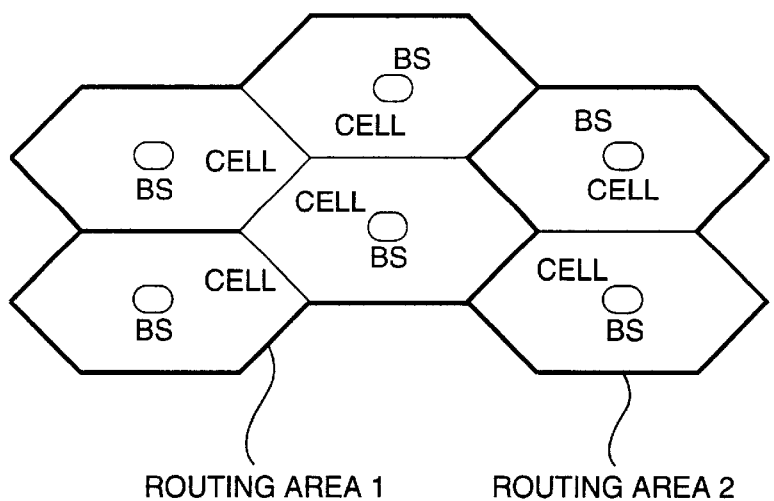
FIG. 3 is a diagram illustrating example base station cells and routing areas.

One type of packet data service is a dedicated service where a dedicated radio channel is continuously reserved between the mobile station and the URAN and is not shared with other mobile stations. Another type of packet data service is a shared service where more than one connection uses the same radio channel, i.e., plural mobile stations share the single channel. In addition to managing different types of radio channels, the mobility of a mobile station is preferably (though not necessarily) managed differently in the present invention depending upon the type of service selected for the connection. Other parameters, such as the connection's bit rate(s), may be specified by the connection service. FIG. 3 is a diagram showing a plurality of adjacent cells, each cell having a corresponding base station. For the dedicated service, when a dedicated radio channel is allocated to a single mobile station, a handover procedure is preferably employed to maintain the connection by transferring it from one base station to another as the mobile moves between cells. Soft and softer handover procedures may preferably be employed in a CDMA system.

For a shared radio service, it may be more efficient to manage mobility from a signaling point of view. A shared radio channel associated with a shared radio service will typically be selected for low traffic and/or where a packet transfer delay is acceptable. In these situations, a mobility management scheme based upon mobile station registration is preferred. When the mobile station enters a new cell, it sends a registration message to the associated network. However, in periods of low traffic from that mobile station, it is unnecessary for the mobile station to register in every cell. In fact, cell update messages may produce as much traffic or even more traffic than substantive user data traffic. For that situation, a next level of registration based on routing areas is desirable. FIG. 3 shows two routing areas: one encompassing four adjacent cells and a second encompassing two adjacent cells. If a mobile station changes routing areas, it sends a routing area registration message to the nearest base station. The network stores the routing area identification number where the mobile station last registered. When a data packet is to be sent to that mobile station, the network sends a page to the mobile station via the base stations controlling cells within the routing area, and the mobile station sends a page response to identify the cell where packets should be sent.

Figure 4:
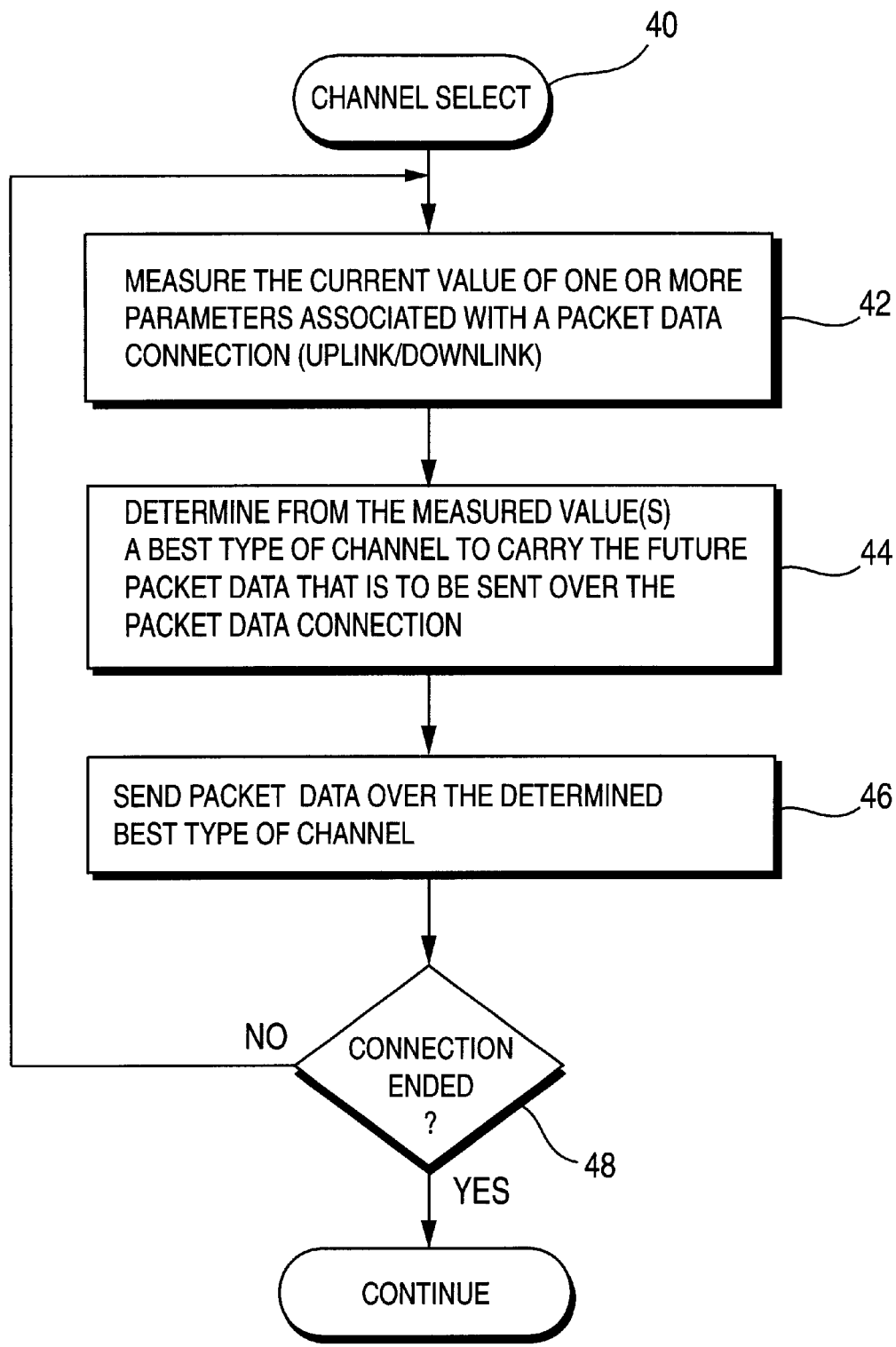
FIG. 4 is a flowchart diagram illustrating example procedures in accordance with a Channel Select routine in accordance with an example embodiment of the present invention.

With respect to one example embodiment of the invention that focuses just on channel type, FIG. 4 illustrates in flowchart format a Channel Select routine (block 40). Accordingly, the "connection state" in this example is characterized by channel type. However, the connection state may specify a different characteristic or more than one characteristic.

Assuming that a connection is already established between the mobile station and the URAN, a current value of one or more traffic parameters associated with that packet data connection is measured (block 42). It may be desirable to make separate measurements of the one or more parameters in both the uplink and the downlink directions because different channel types may be allocated to the uplink and the downlink and because the channel type and mobility management scheme depend on the traffic in both uplink and downlink directions. From the measured value(s) of the one or more connection parameters, the optimal type of channel is determined to carry future packet data to be sent over the packet data connection (block 44). Packet data are then sent over the selected type of radio channel (block 46). A decision is made in block 48 whether one or more conditions have changed, and if so, the Channel Select routine repeats. As a result, the optimal type of channel for the current situation is dynamically determined and allocated so that system resources are efficiently employed.

Figure 5:
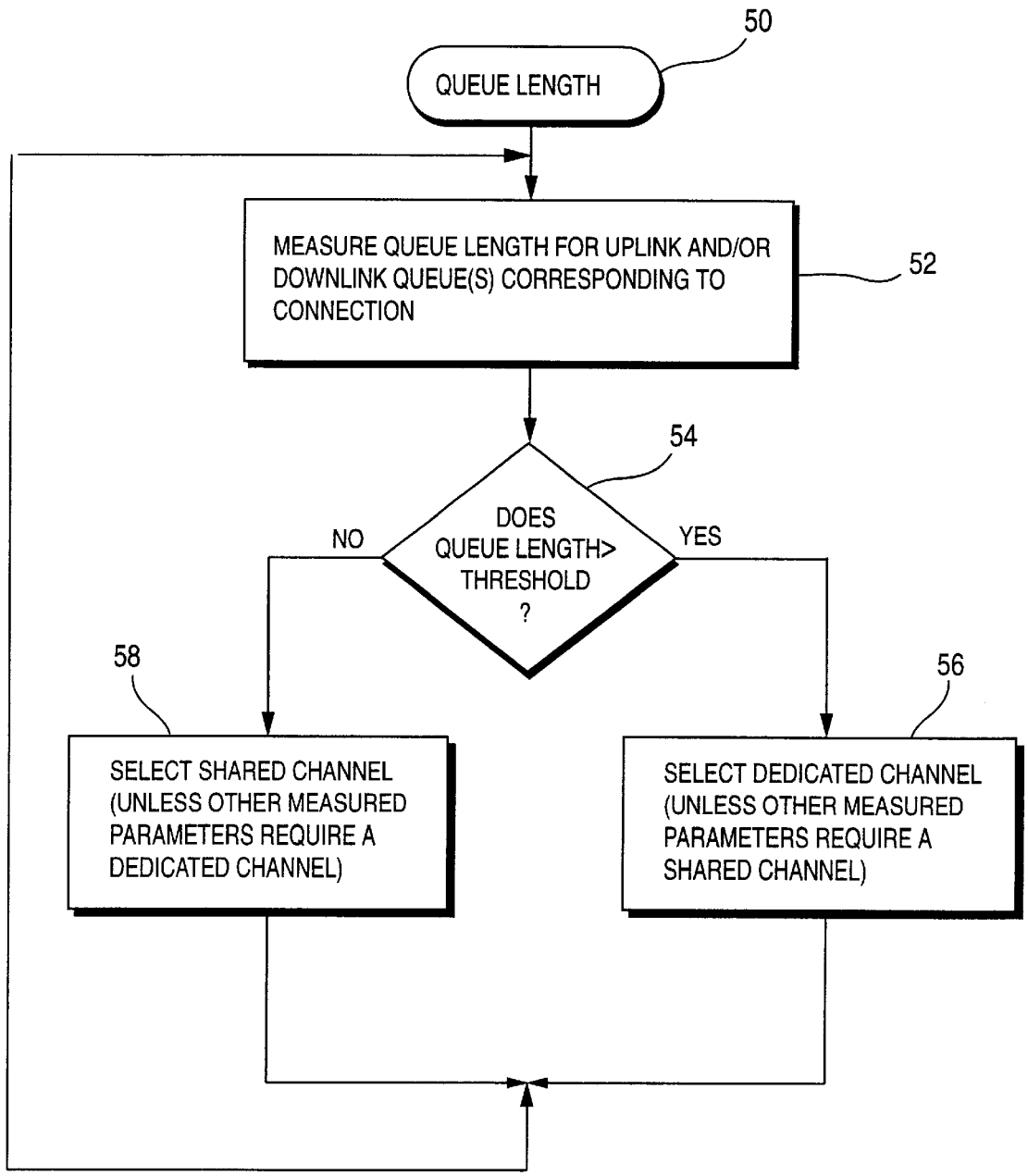
FIG. 5 is a flowchart diagram illustrating example procedures for dynamic channel type selection based on a current amount of data in a connection queue in accordance with an example embodiment of the present invention.

An optimal channel type may be dynamically/adaptively determined and allocated based on a single, relatively simple parameter such as the amount of data currently stored in a connection queue, i.e., queue length, as described now in conjunction with the Queue Length routine (block 50) shown in FIG. 5. Current queue lengths may be specified in an uplink and/or downlink queue(s) corresponding to the connection. Alternatively, a total payload parameter corresponding to the sum of the uplink and downlink queue length may also be employed. A decision is made in block 54 whether the measured queue length exceeds a threshold. If it does, a decision may be made to select a dedicated type channel (block 56). Even though the large queue length indicates that a dedicated channel is appropriate, it may be desirable or necessary to consider other measured parameters which may dictate otherwise. If the queue length does not exceed the threshold, it may be more optimal to transport the smaller payload over a shared type channel (block 58). This decision may also be "overruled" if other parameters are taken into account which on balance indicate that a dedicated channel is either required or more optimal.

Another preferred example embodiment of the present invention uses a different traffic parameter based on packet flow—either a packet arrival rate or a packet density for a particular data packet connection. The future packet flow for a particular connection may be predicted to determine the optimal type of channel and preferably also the type of mobility management scheme to use during a connection. Of course, other parameters, such as the connection's bit rate(s), the current number of idle devices like receivers in each base station, the current number of idle spreading codes, etc. may also be specified. For convenience and simplicity, "connection state" hereafter for this example embodiment refers to a radio channel type and/or a type of mobility management scheme. However, those skilled in the art will appreciate that other connection state parameters are encompassed by the present invention.

Depending on newly predicted packet flows, the selected channel type and/or mobility management scheme may be changed several times for the connection. An example of how the selected channel type may change between a dedicated and a shared type channel during a connection is now described. Two data amount thresholds may be employed to introduce hysteresis into the channel type decision. Changing channel types requires a certain amount of signaling "overhead" (including delay and interference) for channel setup and take down. This overhead is sometimes more significant than the advantage to be gained by switching channel type. Hysteresis is beneficial because it restricts channel type changes to those that are worth the overhead associated with the change. More specifically, when the amount of data to be transmitted is large and exceeds a higher one of the two thresholds, the shared channel may be changed to a dedicated channel. If the amount of data is between the two thresholds, no change is made. If the amount of data to be transmitted is small and less than the lower one of the thresholds, a common or shared channel is selected.

In a preferred, example embodiment, the lower threshold is at or near zero so that an entire amount of data present/in queue is transmit over the dedicated channel before any channel type switch is made. It may also be desirable when the amount of data to be transmit is small, to determine an average intensity parameter or other parameter such as average packet arrival time. If that average traffic intensity or other parameter exceeds a parameter prescribed amount, then it may be preferable to maintain the existing dedicated channel.

Accordingly, once a dedicated channel is assigned to a packet data connection, the next amount of packet data to be sent is determined. If that amount exceeds the first threshold, the connection state is maintained. If the amount is less than the first threshold but greater than the second threshold, the connection state is also maintained. However, if the amount of data to be transmit is less than the second threshold, the connection state is changed to release the dedicated channel and to employ a shared channel.

An alternative but still example method for determining whether to switch from a dedicated radio channel to a shared radio channel is now described. After a last amount of data to be sent is transmitted, (e.g., the transmit queue is empty), a predefined time period is monitored. If a new data packet is not received at the end of that predetermined time period, then the dedicated channel is released and a new shared channel is allocated to the connection. The predefined time period may be determined based on one or more parameters including, for example, a number of available or idle channel resources which may include the number of idle base station receivers. If there is no idle base station receiver, a dedicated radio channel cannot be assigned. However, the connection can be assigned to a shared radio channel. Other factors that may be considered include the battery capacity of the mobile station and the number of idle spreading codes for downlink communications (in a CDMA communications system).

Figure 6:
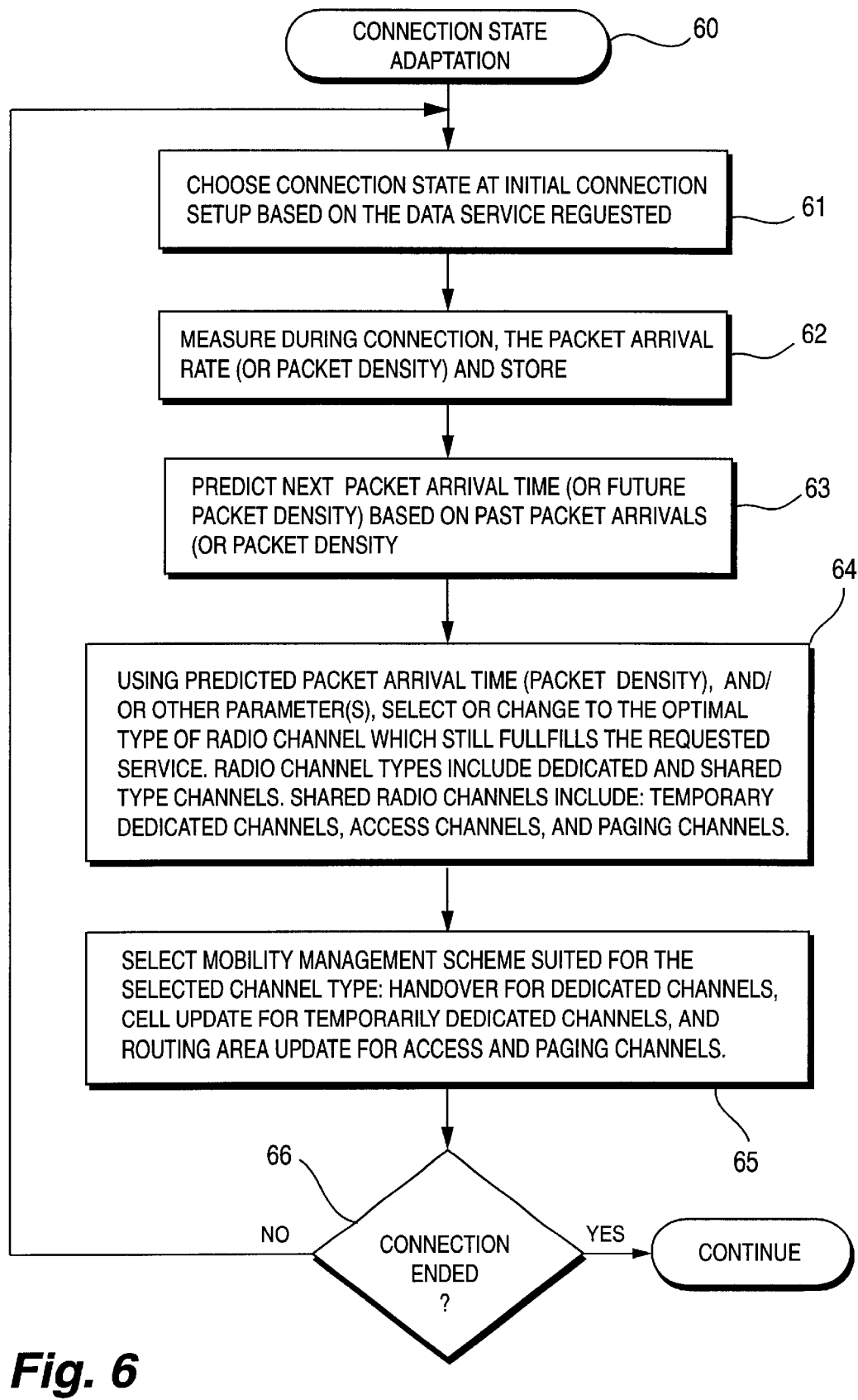
FIG. 6 is a flowchart diagram illustrating example procedures for implementing a Connection State Adaptation routine in accordance with an example embodiment of the present invention.

Reference is now made to the Connection State Adaptation routine (block 60) shown in FIG. 6. As set forth earlier, a connection state in this illustrative example includes a selected radio channel type and a selected mobility management scheme. A connection state is initially selected at connection setup based upon a packet data service requested (block 61). Thereafter, the packet arrival rate or packet density for the connection is measured and stored (block 62). The next packet arrival time for the connection is predicted based on the stored past packet arrival times (block 63). Alternatively, if packet density is the parameter employed, a future packet density is predicted based on past packet density determinations. Using the predicted packet arrival time (or predicted packet density), and possibly (but not necessarily) other parameter(s), an optimal type of radio channel is selected which still also fulfills the requested packet data service (block 64). Radio channel types include both dedicated and shared types of channels. In addition, shared radio channels include temporary dedicated channels, access channels, and paging channels. The optimal mobility management scheme best suited for the selected channel type may also be selected along with other parameters. For reasons described above, a cell update type of mobile management scheme is preferably selected for dedicated, temporarily dedicated, and access radio channels. A routing area update type of mobility management scheme is preferably selected for paging channels (block 65). A decision is made in block 66 whether the connection has been disconnected. If not, the Connection State Adaptation procedures are repeated beginning at block 62.

Figure 7:
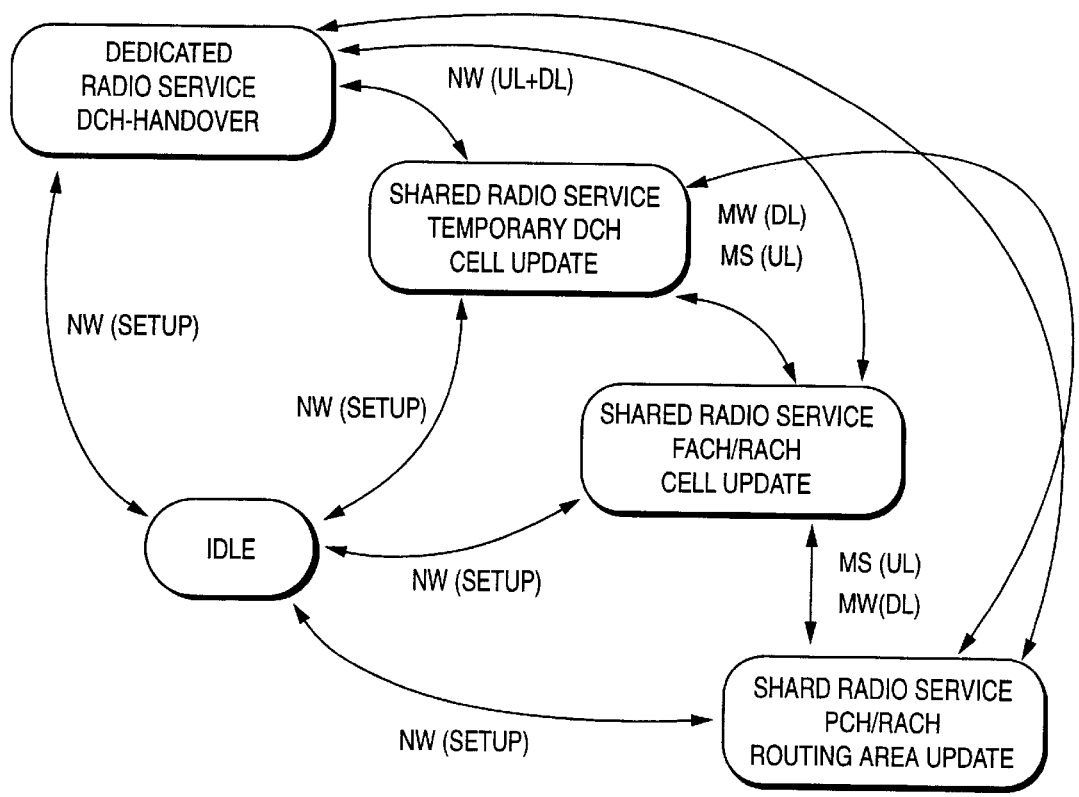
FIG. 7 is a connection state diagram in accordance with an example embodiment of the invention.

FIG. 7 is a state diagram that illustrates the adaptive nature of connection state selection in accordance with this example embodiment where connection states are correlated with radio services. Initially, the connection state is "idle" before a packet data connection is established. When a packet data connection is initially set up by the radio access network, either upon request from a core network or the mobile station, one of the four active connection states is selected using parameter information from the requested data service, e.g., quality of service type parameters such as maximum and average bit rate, delay parameters, etc. All of such characteristics may be condensed into a "service vector" used to make the initial choice of connection state.

The four active connection states include (1) a dedicated radio service that employed a dedicated radio channel (DCH), (2) a shared radio service that employs a temporary DCH, (3) a shared radio service that employs forward access channels (FACH) and random access channels (RACH), and (4) a shared radio service that employs paging channels (PCH) and RACHs. Each connection state also specifies a corresponding mobility management scheme. The dedicated radio service employs handover as the mobility management scheme. The shared radio service using a temporary dedicated channel and the shared radio service for forward and random access channels both employ cell update mobility management schemes. However, the paging channel/random access channel shared radio service uses a routing area update mobility management scheme.

As packets are sent over the connection, the flow of packets is monitored and evaluated, and if appropriate, a new connection state is selected. Based on downlink (DL) packet flow measurements and uplink (UL) packet flow measurements, the radio access network may initiate a connection state change on either or both the downlink and the uplink. The mobile terminal may also initiate a connection state transition based upon packet flow measurements on the uplink between the various shared radio services. When the connection is released by the core network, the radio access network, or the mobile terminal, the flow returns to the idle state.

Figure 8:
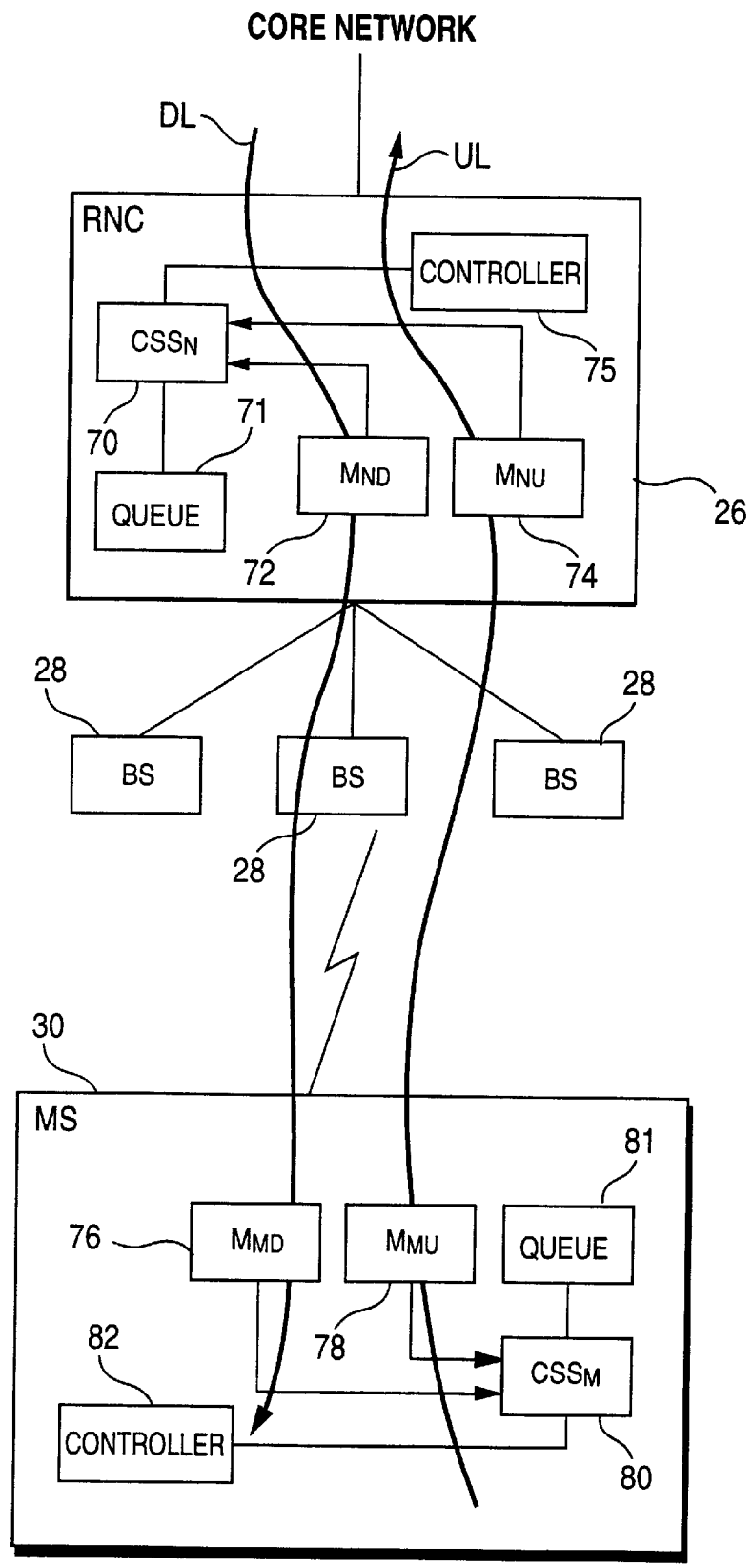
FIG. 8 is a function block diagram illustrating an example implementation of the present invention in the context of the mobile communications system shown in FIG. 2.

FIG. 8 illustrates one example implementation in the mobile communications system of FIG. 2. A connection state selector (CSS) is provided in each radio network controller 26 ($CSS_N$70) and each mobile station 30 ($CSS_M$80). The radio network controller 26 also includes packet flow measurement units for both uplink and downlink directions corresponding to $M_{ND}$72 and $M_{NU}$74. Similarly, the mobile station 30 includes downlink and uplink packet flow measurement units $M_{MD}$76 and $M_{MU}$78. The uplink and downlink directions of the established connection are shown in bold lines. Connection queues 71 and 81 are provided in both the RNC and the mobile station which store current data packets to be sent over the connection. It is to be understood that a connection state selector may be placed in any network node in addition to each mobile station. However, locating the CSS in a base station rather than in the radio network controller may result in significant data shuffling between base stations when the mobile station changes cells to another base station, e.g., historical data for the connection. Since the radio network controller offers the packet data service to the core networks, it is preferable to locate the CSS in the RNC.

The measurement units in the mobile station and in the RNC measure the flow of packets (and other parameters if desired) in both uplink and/or downlink directions by storing packet arrival times which are then transferred to the respective connection state selectors 70 and 80. Rather than packet arrival times, packet density may be employed as the data flow parameter. Packet density may be a better parameter if the packet size is variable. When a connection state selector determines that a connection state change is necessary, it sends a signal to a corresponding controller, i.e., the RNC controller 75 or the mobile station controller 82. The respective controller handles the signaling over the radio interface in order to make the connection state change.

Figure 9:
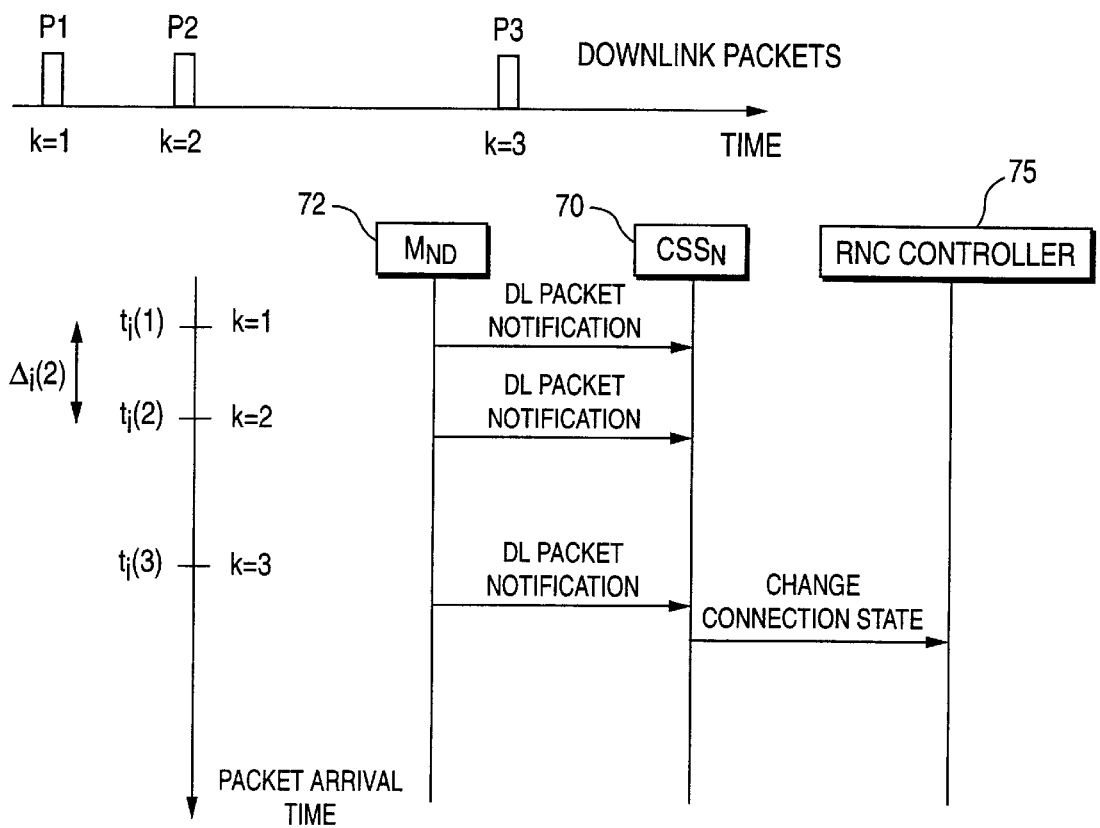
FIG. 9 is timing diagram illustrating data packet arrival times.

FIG. 9 is a diagram which shows an example of downlink packet flow and the interaction between the network downlink measurement unit 72, the network connection state selector 70, and the RNC controller 75. At each packet arrival, the measurement unit 72 sends a downlink packet notification message to the connection state selector 70 containing the packet arrival time $t_i(k)$, a current amount of data $Q_i(k)$ in an incoming packet queue to be transmitted form the network to the mobile station corresponding to this connection, and a measured interference $I_i(k)$ associated with that packet (the uplink interference may, for example, be measured by the BS and sent regularly to the MS and RNC while the downlink interference may be measured by the MS and sent regularly to the RNC via the BS). The subscript i refers to an $i^{th}$ connection, and k refers to the $k^{th}$ packet. Therefore, $t_i(k)$ is the arrival time of packet k during the $i^{th}$ connection. The time elapsed between the $k-1^{th}$ packet and the $k^{th}$ packet during the $i^{th}$ connection is indicated as $\Delta_i(k)$.

Based on the downlink packet identification messages corresponding to the three arrived example packets P1–P3, the network connection state selector 70 may decide to change connection state and sends a change connection state message to the RNC controller 75 with the next connection state. In the context of a CDMA system, if the new connection state is a dedicated radio channel or a temporary dedicated radio channel, the RNC controller allocates a spreading code to the connection and sends messages to the base station(s) currently handling the call as well as to the mobile station with appropriate change of connection state information. Similarly, the RNC controller notifies the mobile station and base station of the mobility management scheme.

Figure 10:
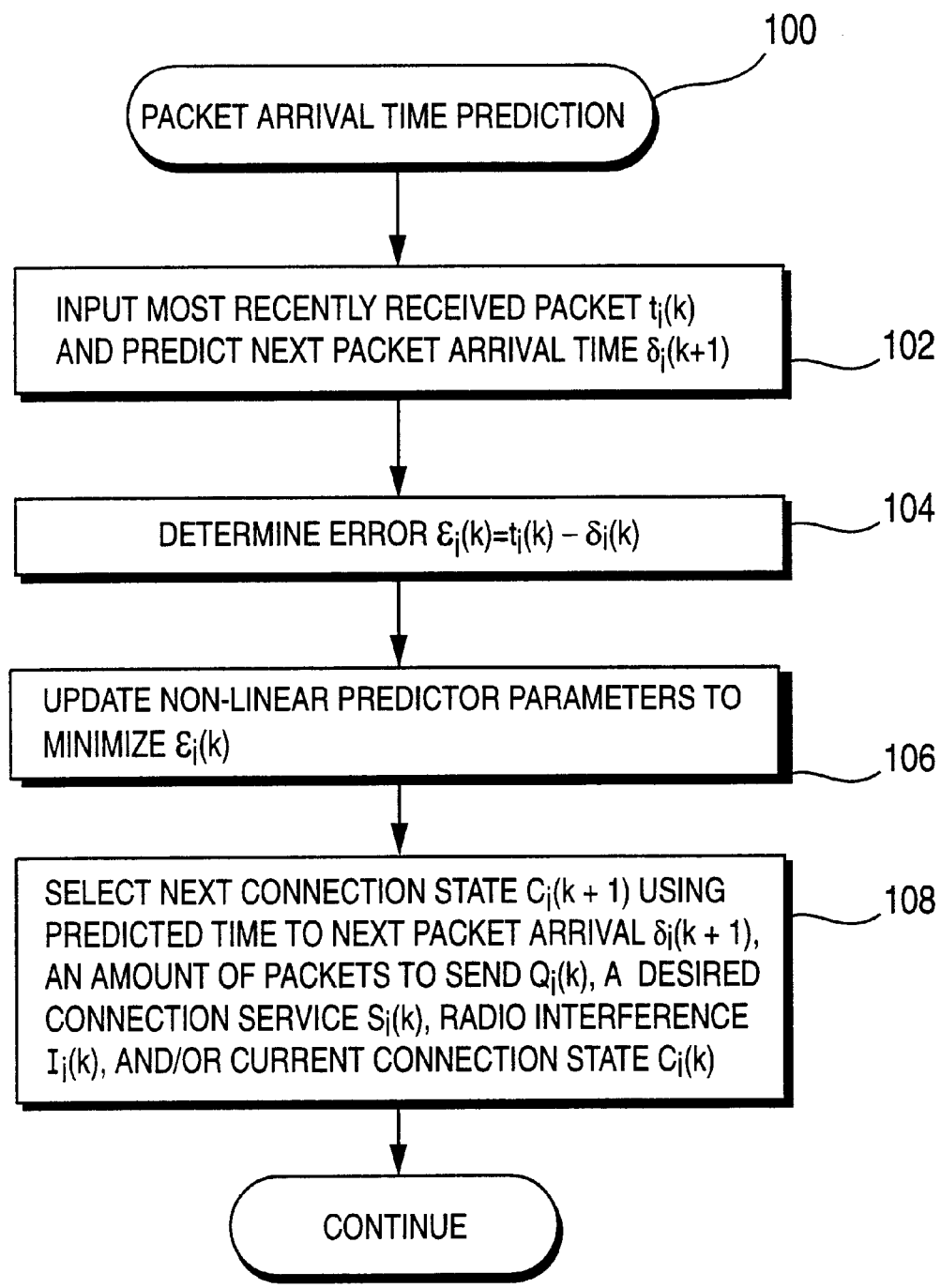
FIG. 10 is flowchart diagram illustrating example procedures in accordance with a Packet Arrival Time Predication routine in accordance with a preferred example embodiment of the present invention.
Figure 11:
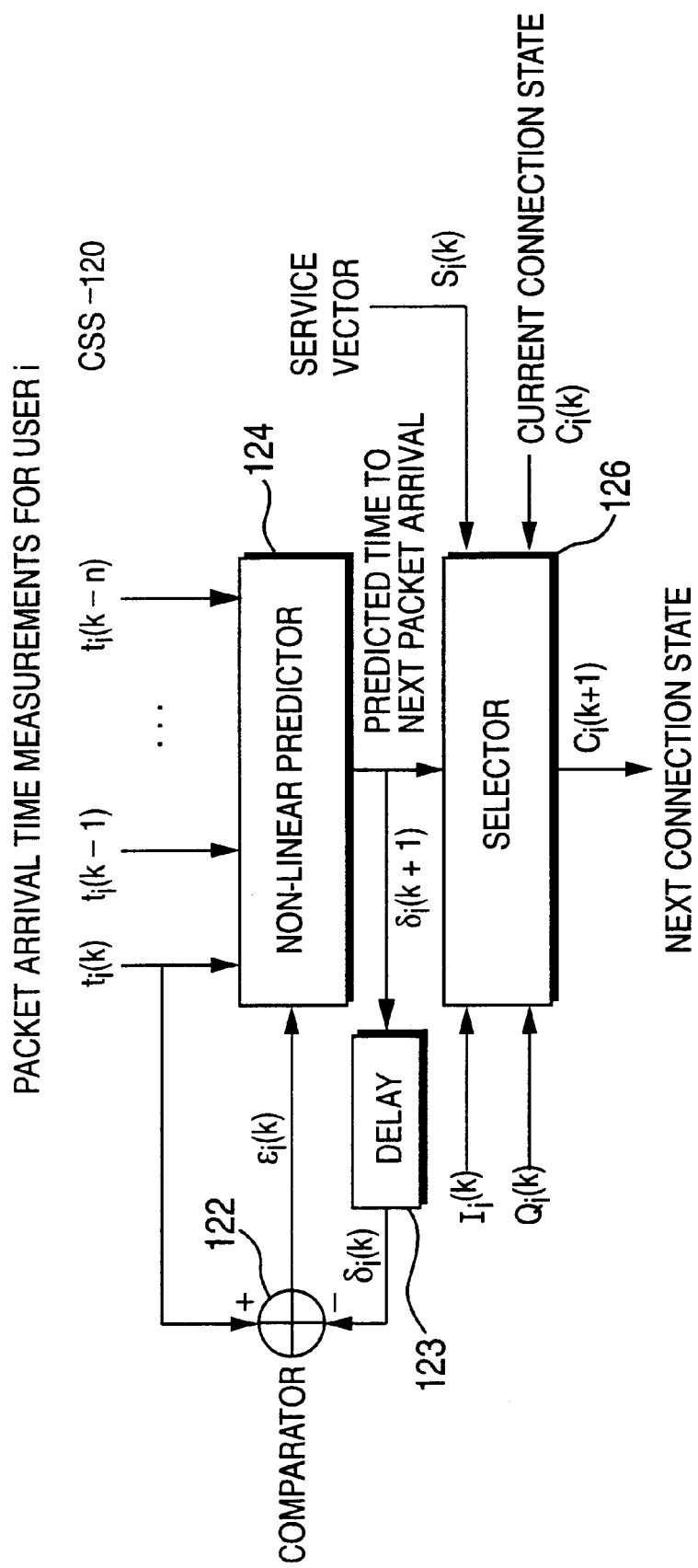
FIG. 11 is a diagram illustrating a connection state selector used to select a next connection state in accordance with a preferred example embodiment of the present invention.

Further example implementation details regarding prediction of next packet arrival time and connection state selection based thereon are provided in conjunction with Packet Arrival Time Prediction routine (block 100) shown in flowchart format in FIG. 10 and the function block diagram illustrating an example connection state selector shown in FIG. 11. In general, the connection state selector 120 for each connection state iteration, inputs a most recently received packet arrival time $t_i(k)$ and predicts in a non-linear fashion a next packet arrival time $\delta_i(k+1)$ using a non-linear predictor 124 (block 102). The predicted next packet arrival time is input into a comparator 122 after a corresponding delay 123 and compared with the most recent packet arrival time $t_i(k)$ to generate an error $\epsilon_i(k)$ (block 104). The error $\epsilon_i(k)$ is used to update the non-linear predictor parameters in such a way so as to minimize the error $\epsilon_i(k)$ (block 106).

A selector 126 receives the predicted time to next packet arrival $\delta_i(k+1)$ from the non-linear predictor 124 and uses that prediction to determine a next connection state $C_i(k+1)$. Again, while the next connection state may be selected based simply on that parameter $\delta_i(k+1)$ alone, in a preferred example embodiment, the selector 126 takes into account one or more other parameters such as an amount of packets (queue length $Q_i(k)$) to be sent over the connection, a service vector $\delta_i(k)$, current radio interference $I_i(k)$, and/or the current connection state $C_i(k)$ (block 108).

Typically, a long queue suggests a dedicated channel or a temporary dedicated channel. A common channel is probably better suited for a short queue. A service vector requiring a high data rate and/or short delay indicates that a dedicated channel or a temporary dedicated channel is a better selection. A high radio interference value indicates that a dedicated channel most likely is preferred, as opposed to a temporary dedicated channel or common channel, because temporary dedicated and common channels generate greater interference than a dedicated channel. Still further, an earlier predicted packet arrival time indicates selection of a dedicated channel—even if the queue is short—especially if the bearer service requires a short delay.

Figure 12:
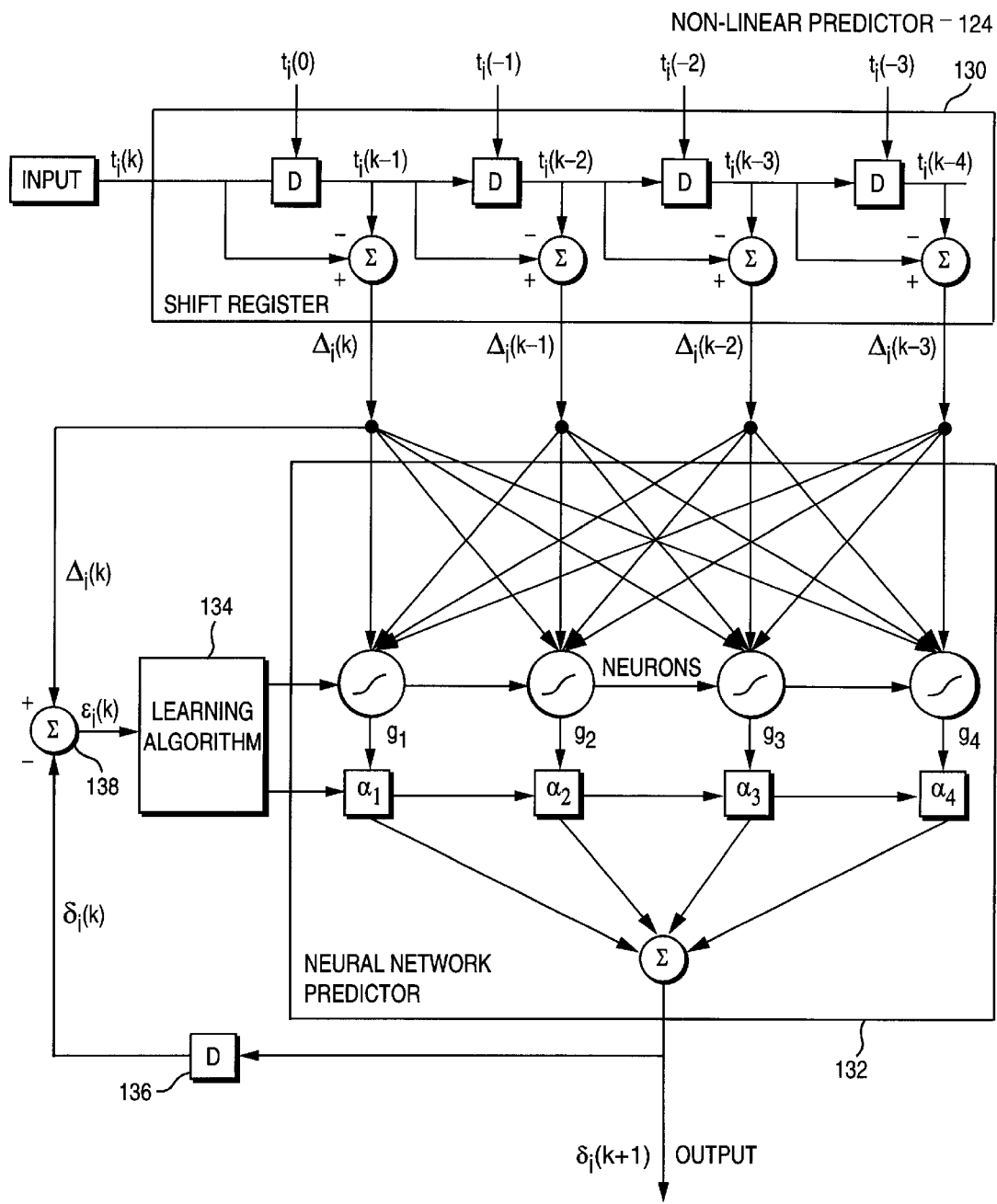
FIG. 12 is a diagram illustrating the non-linear predictor shown in FIG. 11.

The non-linear predictor 124 preferably employs a neural network prediction and learning approach as shown in FIG. 12. Of course, other types of predictors could be used such as Kalman filter-based model, a fuzzy, self-learning based model, etc. Packet arrives times $t_i(k)$ are input to a delay line type shift register 130. The output of each delay D is sent onto a next delay stage as well as input to a summing block. The output of each summer $\Sigma$ generates a time elapsed $\Delta_i(k)$ between two consecutive packets over the connection. When the connection i is established, k is set to zero as well as all of the inputs $t_i(0), \ldots t_i(-n+1)$, where n is the number of previous packets used to predict a future packet.

Example values of n are 2, 3, or 4. Alternatively, initial non-zero packet arrival times $t_i(0), \ldots t_i(-n+1)$ may be set based upon statistically or otherwise empirically determined values. The initial connection state $C_i(0)$ is preferably set using a service vector $S_i$. For example, if $S_i$="First Class," then $C_i(0)$=DCH; if $S_i$="Business Class," then $C_i(0)$=FACH/RACH; and if $S_i$="Economy Class," then $C_i(0)$=PCH/RACH.

When a new packet arrives at time $t_i(k)$, k is incremented by 1 and the memory delay blocks are simultaneously updated. The shift register 130 outputs corresponding elapsed times $\Delta_i(k), \ldots, \Delta_i(k-3)$. An error signal $\Delta_i(k)$ is generated by comparator 138 by determining the difference between $\Delta_i(k)$ and the previous predicted arrival time output from delay 136 corresponding to $\delta_i(k)$. The learning algorithm 134 is used to process the calculated error. Preferably, the learning scheme employs a standard recursive prediction error algorithm (RPEM) with a forgetting factor. However, other algorithms could be used such as recursive least squares (RLS). The parameters updated by the learning scheme 134 include a weight $\alpha$ for each neuron on neural network predictor 132 as well as a scalar $\beta$ (one for each input to the neuron) and a position $\gamma$ (one for each neuron). The scalar $\beta$ and position $\gamma$ parameters are shown in FIG. 11 as a corresponding activation function g, where g is also a function of $\Delta$. While the activation functions g are shown as sigmoids, they can also be Gaussians or any continuous function returning values between "0" and "1." A "1" means that the corresponding neuron is fully active, and a "0" means that the corresponding neuron is completely inactive.

In any event, the learning scheme looks at the deviation between the measured and predicted packet arrival times and tries to update the parameters of the activation functions so that this difference is reduced to the smallest value possible. The summed outputs of the weighted neuron outputs corresponds to the predicted next of packet arrival time $\delta_i(k+1)$. In FIG. 12, $\delta_i(k+1) = \alpha_1 g_1 + \alpha_2 g_2 + \alpha_3 g_3 + \alpha_4 g_4$. Functions of the form $$\delta_i(k+1) = \alpha_1^i g_1^i(\Delta_i, \beta_1^i, \gamma_1^i) + \ldots + \alpha_4^i g_4^i(\Delta_i, \beta_4^i, \gamma_4^i),$$

may be built where $\Delta_i(k) = \Delta_i(k) \ldots, \Delta_i(k-3)$. The activation function g may be chosen in different ways, e.g., as a sigmoid:

$$g_j^i(\Delta_i, \beta_j^i, \gamma_j^i) = \frac{1}{1 + e^{-(\beta_j^{iT}\Delta_i - \gamma_j^i)}},$$

where $\beta_j^i$ may be a vector with four components such as $$\beta_j^{iT}\Delta_i = \beta_j^i(1)\Delta_i(1) + \beta_j^i(2)\Delta_i(2) + \beta_j^i(3)\Delta_i(3) + \beta_j^i(4)\Delta_i(4).$$

Regarding the inputs to the selector 126, it may be assumed that the service vector $\delta_i(k)$ and the current connection $C_i(k)$ assume hard values. The other inputs may be described by soft values or fuzzy sets where the transition from being true to being false is gradual, and the degree of which is characterized by what is sometimes referred to as a membership function. Consider the following example:

|  | Notation | Values (example) |
|---|---|---|
| Input |  |  |
| Desired bearer service | $S_i$ | Economy, Business, First |
| Current connection state | $C_i(k)$ | DCH, TDCH, FACH/RACH, PCH/RACH |
| Predicted time to the next packet arrival | $\delta_i(k+1)$ | Soon, Late |
| Radio interference | $I_i(k)$ | Low, High |
| Current packet queue length | $Q_i(k)$ | Short, Long |
| Output |  |  |
| Next connection state | $C_i(k+1)$ | DCH, TDCH, FACH/RACH, PCH/RACH |

The mapping from the inputs to the output may be described by a number of rules, e.g., 1—if ($S_i$ is Economy) and ($C_i(k)$ is DCH), then apply the following rules:
  if($Q_i(k)$ is Short), then $C_i(k+1)$ is FACH/RACH
  if ($\delta_i(k+1)$ is Soon) and (($Q_i(k)$ is Long), then $C_i(k+1)$ is DCH
  if ($\delta_i(k+1)$ is Late) and ($I_i(k)$ is Low) and ((k) is Long), then $C_i(k+1)$ is DCH
  if ($\delta_i(k+1)$ is Late) and ($I_i(k)$ is High) and ($Q_i(k)$ is Long),then $C_i(k+1)$ is DCH 2—if ($S_i$ is Business) and ($C_i(k)$ is FACH/RACH), then apply the following rules:
  if ($\delta_i(k+1)$ is Soon) and ($Q_i(k)$ is Short), then $C_1(k+1)$ is FACH/RACH
  if ($\delta_i(k)$ is Low) and ($Q_i(k)$ is Long), then $C_1(k+1)$ is TDCH
  if ($\delta_i(k+1)$ is Soon) and ($I_i(k)$ is High) and ($Q_i(k)$ is Long),then $C_i(k+1)$ is DCH
  if ($\delta_i(k+1)$ is Late) and ($Q_i(k)$ is Short), then $C_i(k+1)$ is PCH/RACH
  if ($\delta_i(k+1)$ is Late) and ($I_i(k)$ is High) and ($Q_i(k)$ is Long), then $C_i(k+1)$ is DCH 3—if ($S_i$ is First) and ($C_i(k)$ is TDCH), then apply the following rules:
  if ($I_i(k)$ is Low), then $C_i(k+1)$ is TDCH
  if ($\delta_i(k+1)$ is Soon) and ($I_i(k)$ is High), then $C_i(k+1)$ is DCH
  if ($\delta_i(k+1)$ is Late) and ($I_i(k)$ is High) and ($Q_i(k)$ is Short, then $C_i(k+1)$ is FACH/RACH
  if ((i (k+1) is Late) and ($I_i(k)$ is High) and ($Q_i(k)$ is Long), then $C_i(k+1)$ is DCH Because $S_i$ can be assigned three different values and $C_i(k)$ four different values, there are twelve different combinations of these inputs, each of which is associated with a set of rules of the kind given above. However, only one of these sets will be active at one time, so the computational burden is moderate.

The just-described, example embodiment of the present invention selects the optimal channel and mobility management scheme for a packet-switched connection. As a result, radio channel resources (e.g., CDMA spreading codes), are optimally utilized. Dedicated channels are used only when necessary or efficient. Users that do not have strict delay requirements may be allocated common channels with scheduled and queued transport. On the other hand, dedicated channels may be selected even for low data rates or small amounts of data in high interference conditions in order to minimize further interference. Using the present invention, it is possible to predict future packet bursts and to use that prediction to, in appropriate situations, change a channel type (and other connection state parameters) from one channel type to another to carry a next burst of packets.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. For use in packet data communications, a method comprising:

determining for a packet data communication a packet flow parameter associated with the packet data communication;

predicting a future value of the packet flow parameter associated with the packet data communication using the determined packet flow parameter; and dynamically selecting one type of a channel from a plurality of different channel types for the packet data communication based on the predicted parameter, wherein the different types of channels include a dedicated channel carrying packet data associated with one communicating device and a shared channel carrying packet data associated with more than one communicating device.

2. The method in claim 1, wherein the packet flow parameter is packet arrival time.

3. The method in claim 1, wherein the packet flow parameter is packet density.

4. The method in claim 1, wherein the channels are radio channels, and wherein the shared radio channel type may be selected from a temporary dedicated radio channel, a forward access channel, a random access channel, and a paging channel.

5. The method in claim 1 as applied to a mobile communications system, further comprising:

dynamically selecting one of plural mobility management schemes suited to the selected channel type.

6. The method in claim 5, wherein the plural mobility management schemes include a first handover scheme, a second scheme where a mobile station's location is monitored on an individual cell basis, and a third scheme where a mobile station's location is monitored on a routing area basis, where a routing area includes plural cells.

7. The method in claim 1, where a bit rate is selected based on the predicted parameter.

8. The method in claim 1, wherein the packet flow is used to predict a future amount of data to be transmitted associated with the communication, and wherein one channel type is selected when the amount of data to be transmitted exceeds a first threshold and another channel type is selected when the amount of data to be transmitted is less than the first threshold.

9. The method in claim 8, further comprising:

providing a second threshold less then the first threshold, wherein the other channel characteristic is selected when the amount of data to be transmitted is less than or equal to the second threshold.

10. The method in claim 8, further comprising:

considering at least one other traffic parameter in addition to the amount of data to be transmitted in selecting the channel characteristic.

11. The method in claim 10, wherein the one other traffic parameter is one of the following: number of channels of each type currently available, a specified quality of service, a current interference level, and a number of available radio channel resources.

12. The method in claim 10, further comprising:

measuring interference in one or both of uplink and downlink directions.

13. For use in a communications system that provides plural communication services, a method comprising the steps of:

determining for a packet data connection, a packet flow parameter;

predicting a packet flow parameter using the determined packet flow parameter; and dynamically selecting one connection state from a plurality of connection states for the packet data connection based on the predicted packet flow parameter, wherein each connection state specifies one of different types of mobile radio services.

14. The method in claim 13, wherein the packet flow parameter is packet arrival time.

15. The method in claim 13, wherein the packet flow parameter is packet density.

16. The method in claim 13, wherein each radio service specifies a type of channel and a mobility management scheme for keeping track of a location of a mobile if station.

17. The method in claim 16, wherein each service also specifies a bit rate.

18. The method in claim 16, wherein the radio services include a dedicated radio service where service is provided exclusively for one mobile station and a shared radio service where service is shared with more than one mobile station.

19. The method in claim 18, wherein the dedicated radio service includes a reserved dedicated radio channel and the shared radio service includes one of: a temporary dedicated radio channel, a forward access channel, a random access channel, and a paging channel.

20. The method in claim 19, wherein the mobility management scheme includes a first handover scheme, a second scheme where a mobile station's location is monitored on an individual cell basis, and a third scheme where a mobile station's location is monitored on a routing area basis, where a routing area includes plural cells.

21. The method in claim 13, further comprising:

dynamically selecting another of the connection states for the packet data connection based on a change in the predicted packet parameter during the packet data connection.

22. The method in claim 13, wherein the packet flow parameter is used to predict a future amount of data to be transmitted associated with the connection, and wherein one connection state is selected when the amount of data to be transmitted exceeds a first threshold and another connection state is selected when the amount of data to be transmitted is less the first threshold.

23. The method in claim 22, further comprising:

providing a second threshold less than the first threshold, wherein the other connection state is selected when the amount of data to be transmitted is less than or equal to the second threshold.

24. The method in claim 22, further comprising:

considering at least one other traffic parameter in addition to the amount of data to be transmitted in selecting the connection state.

25. The method in claim 22, wherein the considered other parameter is one of the following: number of channels of each type currently available, a specified quality of service, and a current interference level, and a number of available radio channel resources.

26. In a mobile communications system permitting selective communications with mobile stations, a controller comprising:

a connection state selector for establishing a packet data connection with a mobile station at an initial connection state, a connection state specifying one of different radio services, and a predictor for predicting a time to a next packet arrival over the packet data connection using the packet arrival times of n most recent data packet arrival times over the connection, wherein the connection state selector is configured to determine a next connection state based on the predicted next data packet arrival time.

27. The controller in claim 26, wherein the connection state selector is configured to determine the next connection state also based on one or more of the following a desired bearer service, a current connection state, current radio interference, and a current packet queue length in a queue associated with the connection.

28. The controller in claim 26, wherein the predictor is a non-linear predictor for predicting packet arrival times of plural packets over the connection.

29. The controller in claim 28, wherein the non-linear predictor is a neural network, the controller further comprising:

a comparator for comparing a current packet arrival time to a corresponding predicted packet arrival time to determine an error, and an adapter for adapting neural network parameters to reduce the error.

30. The controller in claim 29, wherein the neural network adapter is configured to employ a recursive prediction error algorithm with a forgetting factor.

31. The controller in claim 29, wherein the neural network is configured to receive as inputs elapsed times between packet arriving over the connection.

32. The controller in claim 28, wherein each radio service specifies a type of channel and a mobility management scheme for keeping track of a location of a mobile station.

33. The controller in claim 32, wherein the radio services include a dedicated radio service where service is provided exclusively for one mobile user and a shared radio service where service is shared with more than one mobile user.

34. The controller in claim 33, wherein the shared radio service includes: a temporary dedicated radio channel, a forward access channel, a random access channel, and a paging channel.

35. The controller in claim 32 wherein the mobility management scheme includes a first handover scheme, a second scheme where a mobile station's location is monitored on an individual cell basis, and a third scheme where a mobile station's location is monitored on a routing area basis, where a routing area includes plural cells.

36. The controller in claim 28, wherein the connection state selector is configured to select another of connection states for the packet data connection based on a change in the predicted next data packet arrival time during the packet data connection.

37. The controller in claim 26, wherein the packet data parameter is an amount of data to be transmitted associated with the packet data connection used to predict a future amount of data to be transmitted associated with the connection, and wherein one type of channel is selected when the amount of data to be transmitted exceeds a threshold and another type of channel is selected when the amount of data to be transmitted is less than or equal the threshold.

38. The controller in claim 37, wherein the connection state selector is configured to consider at least one other traffic parameter in addition to an amount of data to be transmitted in selecting the type of channel.

39. The controller in claim 38, wherein the one other parameter is one of the following: number of channels of each type currently available, a specified quality of service, and a current interference level.

40. The controller in claim 26 as employed in a mobile station.

* * * * *